United States Patent Office 3,528,846
Patented Sept. 15, 1970

3,528,846
BACK-COATED CERAMIC ACOUSTICAL PRODUCT AND METHOD OF MANUFACTURE
Frank Celmer and Ernest B. Waters, Jr., Lancaster, Pa., assignors to Armstrong Cork Company, Lancaster, Pa., a corporation of Pennsylvania
No Drawing. Filed May 22, 1967, Ser. No. 640,420
Int. Cl. C04b 43/02
U.S. Cl. 117—123                                                                       4 Claims

ABSTRACT OF THE DISCLOSURE

A back coating of particles of kaolin clay dispersed in a water slurry is applied to an unfired porous mineral wool-clay board and the coated board is fired to provide a porous ceramic acoustical board product having a barrier coat which effectively cuts down sound transmission.

CROSS-REFERENCES TO RELATED APPLICATION

This application is concerned with ceramic acoustical products of the type disclosed in Ollinger U.S. application Ser. No. 466,477, filed June 22, 1965, now U.S. Pat. No. 3,371,134 and Ollinger U.S. application Ser. No. 688,637, filed Oct. 4, 1967, now U.S. Pat. No. 3,470,062.

SUMMARY

An object of this invention is to increase the decibel rating of a porous ceramic acoustical product while retaining the advantages of the incombustibility of an all-ceramic board. This is achieved by forming a sound barrier on the back of an inorganic wool-clay porous ceramic board, the method including the application of a slurry containing particles of kaolin clay dispersed in water to the back of an unfired board comprised of mineral wool and clay and the firing of the coated board. The clay particles have an average size of from about 1.0 to 2.0 microns and are applied at a rate such as to give a coating of greater than about 15 grams of clay, on a dry weight basis, and the coated board is fired at a temperature in the range of from about 1000° F. to 1600° F. to form the ceramic bonded product.

DETAILED DESCRIPTION

Two methods are currently used in rating acoustical ceiling products to determine how well they function in controlling the noise level in buildings in which such acoustical products are installed. One of the methods used for rating such ceiling products is a measurement designated noise reduction coefficient. This is a measure of the sound absorbed within the ceiling products which are used in forming ceilings in buildings. A second method of rating such ceiling products is a measurement of the drop in sound intensity (in decibels) from one side of the ceiling product to the other. This is a measure of the ability of the ceiling product to reduce sound transmission between rooms.

In Ollinger U.S. application Ser. No. 466,477, filed June 22, 1965, there is disclosed a ceramic acoustical product and a method of making the same. Basically the product is formed from a water slurry of a clay having the clay characteristics of Mississippi M & D clay and mineral wood. The slurry can be used to form a water-laid felt using standard board-making equipment after which the product is dried and fired to form a ceramic bonded product of relatively low density having a good noise reduction coefficient which is due to the porous nature of the fired product. Primarily because of the porous nature of the fired product, the decibel rating, in common with similar porous products which have good noise reduction coefficients, is quite low and there is considerable sound transmission from one side of the board product to the other. This decibel rating is directly related to the air flow resistance of the porous product and, in the porous ceramic products with which this invention is concerned, such air flow resistance is negligible. As is well known in the art, the air flow resistance can be enhanced by painting or coating the acoustical products with a resin containing back coat which in turn provides a barrier to sound transmission.

Surprisingly we have found that a conventional seal coat on the back of the ceramic acoustical products with which this invention is concerned does not result in significantly increasing the air flow resistance. Thus, when the back of the fired product was painted with a conventional paint containing an organic film former the air flow resistance was only increased to about 800 rayls. Generally speaking, in order for there to be a significant reduction in sound transmission, the acoustical products should exhibit an air flow resistance of at least about 10,000 rayls. This would be equivalent to about a 40 decibel drop at a density of about 2 pounds per board foot.

In accordance with this invention, we have discovered that a clay slip back coating can be fired onto the back surface of the ceramic ceiling product to give air flow resistances well in excess of 10,000 rayls. The product thus formed retains the advantages of incombustibility of an all-ceramic product. In order to develop the necessary air flow resistance, the clay must be applied as a back coating at a rate greater than about 15 grams of clay per square foot, on a dry weight basis. Obviously, the thicker the coating the larger the drop in decibel rating. However, for maximum air flow reduction at a minimum clay level we have found that a rate of 22–23 grams of clay on a dry weight basis per square foot provides more than an adequate increase in air flow resistance.

It has also been found that not all clays will work equally as well in forming the back coatings in accordance with this invention. We have found that it is necessary to use a kaolin clay having an average particle size of from about 1.0 to 2.0 microns in order to achieve the sound transmission barrier desired and to achieve a product which will not exhibit any undesirable physical properties such as warpage. In addition, the coat should be applied prior to firing the board to minimize thermal shock. A single firing step also achieves economics in manufacture.

In forming the back-coated ceramic acoustical products, an unfired board comprised of 35–80% by weight of an inorganic wool and 20–65% by weight of clay is initially formed and dried in accordance with the disclosure of U.S. application Ser. No. 466,477, filed June 22, 1965. Next, a clay slip coating comprised of particles of koalin clay dispersed in a water slurry is applied at a rate greater than about 15 grams of clay per square foot, on a dry weight basis, to the back of the dried board product. The particles of clay preferably have an average particle size of 1.0 to 2.0 microns with a particle size distribution such that less than about 40% by weight of the clay particles are less than 1.0 micron in size and more than 80% by weight of the clay particles are less than about 5.0 microns in size. The coated board product is next fired at a temperature of from about 1000° F. to 1600° F. to form the ceramic bonded product having a ceramic bonded clay slip back coating integrally fired thereon.

The following examples will serve to more fully illustrate the invention:

Example 1

A slurry containing 96.3% water and having a solids consistency of 3.7% and of the following formulation was flowed from a head-box onto a fourdrinier screen to give a water-laid sheet approximately 12 feet in width.

| Solid ingredients: | Percent by weight |
|---|---|
| Papermakers alum (aluminum sulfate) | 0.5 |
| Iron blast furnace slag wool | 55.0 |
| Mississippi M & D clay | 38.5 |
| NaHCO₃ | 5.0 |
| Tapioca starch | 1.0 |
| | 100.0 |

To the above 0.50% by weight polyox is added.

The average thickness of the sheet laid up on the fourdrinier screen was 0.740″; this thickness giving, on drying an average density of 2.18 pounds per board foot and an average dry thickness of .687″. Water was drained from the water-laid sheet on formation on the screen and by passing the sheet thus formed over a series of suction boxes and through a roll press where further water pressed from the sheet was removed by vacuum. The sheet thus formed, containing about 55.7% water, was cut into 12′ x 12′ sections and passed through a drier where heated air and temperatures up to 600° F. was circulated around the sheet to remove the remaining water. The 12′ square sections were then cut into panels of 4′ x 6′ dimensions and were face sanded to a final thickness of 0.6″. These panels were then fissured to provide a face design after which an air knife was used to remove the dust from the face surface and from the interior of the fissures. The back of the panels was then brushed to remove any dust therefrom.

The thus prepared panels were back coated with a roll coater using a clay slip formulation comprised of 70% by weight of clay predispersed in a water slurry at a rate which yielded a coating of from 22–23 grams per square foot on a dry weight basis. The clay used was a fine particle size, white, insoluble, nonhydroscopic, inert, water washed kaolin known as Klondyke which has been specially processed to remove hard particles, sand mica, water soluble salts and moisture. It has an average particle size of 1.5 microns with a particle size distribution as follows:

| Particle size distribution (in microns): | Percent by weight |
|---|---|
| 0–½ | 20 |
| ½–1 | 21 |
| 1–2 | 17 |
| 2–5 | 23 |
| 5–10 | 12 |
| 10–30 | 7 |

This particular clay is mined at Gardner, Ga., and sold by Minerals & Chemical Philipp Corporation, Menlo Park, N.J.

After the back coating was applied to the unfired board product, the board products were passed, with the back coating facing down, over a series of rollers having gas ribbon burners spaced therebetween to dry the surface of the coating so as to prevent sticking to the rollers. The unfired board products were then passed through a kiln where they were fired at a temperature of 1350° F. for about 8 minutes. A series of measurements taken on boards thus formed gave an average decibel rating of over 40 and an average air flow resistance in excess of 40,000 rayls.

When a coarser clay was substituted for the kaolin clay, we found that the boards produced in accordance with the above example showed excess warpage. This was true, for instance, when Old Hickory 5S ball clay was substituted for the Klondyke clay of Example 1. Surprisingly, we have also found that clays of finer particle size range, when substituted for the Klondyke clay of Example 1, also gave fired products having excess warpage. For example, when Mississippi M & D clay was substituted for the Klondyke clay in Example 1, the fired board products exhibited even greater warpage characteristics. We have noticed that the coating produced by the Klondyke clay, after firing, is bound together sufficiently well to prevent rubbing off to any great extent during handling operations and the coating seems to be a well bound coating although energetic rubbing will cause some of the coating to be rubbed off. The lack of a good real bond is apparently not enough to be detrimental to the sticking of the clay slip coating to the board and the slip does reduce surface porosity to the required degree. Clays forming stronger bonds apparently set up stress characteristics in the board during firing which compete with the stress characteristics in the board per se, apparently a cause of the excessive warpage.

Each of the three clays mentioned above, namely the Klondyke clay, the Old Hickory 5S ball clay, and the Mississippi M & D clay were formed into clay bars and these clay bars were then subjected to a test to determine the modulus of rupture. In each instance, standard bars 1″ x 1″ x 7″ were formed from a well mixed composition which comprised 50% by weight of Ottawa sand and 50% by weight of the respective clay for which the modulus of rupture was being determined. In forming the bar the sand-clay composition was wetted with water until the mix was plastic, and this was then formed into the desired size bar and allowed to dry at room conditions for one week. The bars thus dried were then oven dried and fired at 1400° F. for 8 hours. After firing they were conditioned at 73.4° F. in 50% relative humidity for 72 hours. They were then tested for modulus of rupture on a 5″ span according to ASTM C-93. The following results were determined:

TABLE 1

| Clay | Density in lbs./cu. ft. | Modulus of rupture in lbs./sq. in. |
|---|---|---|
| Klondyke | 110.3 | (¹) |
| Mississippi M & D | 115.9 | 390 |
| Old Hickory 5S | 106.5 | 145 |

¹ Bars formed from the Klondyke clay-sand mixture as above described were too weak to be tested.

These tests show the degree of warpage set up in the fired coated board product to be related to the modulus of rupture of the specific clay used for the coating when tested in accordance with the above. Generally speaking, clays having a modulus of rupture of less than 50 lbs./sq. in. (determined as above-described) will yield satisfactory coatings in that the coated board will not tend to warp on firing.

We claim:

1. A method of back-coating a ceramic acoustical product to form an acoustical product having a barrier coating resistant to sound transmission comprising:

(a) back coating, at a rate greater than about 15 grams of clay per square foot, on a dry weight basis, an unfired mineral wool-clay board formed from a water-laid sheet comprised of 20–65% by weight of Mississippi M & D clay and 35–80% by weight mineral wool with a coating consisting essentially of particles of kaolin clay dispersed in a water slurry, the average particle size of said clay being from about 1.0 to 2.0 microns and said clay, when mixed with 50% by weight of Ottawa sand and fired as a sand-clay brick, having a modulus of rupture of less than about 50 lbs. per square inch; and (b) firing the coated board at a temperature in the range of from about 1,000°–1,600° F. to form a ceramic bonded product.

2. The method in accordance with claim 1 in which said clay is Klondyke clay of a particle size distribution such that less than about 40% by weight of the particles are less than 1.0 micron in size and more than 80% by weight of the particles are less than about 5.0 microns in size.

3. A porous ceramic acoustical board formed from a water-laid sheet comprised of 20–65% by weight of a clay having the clay characteristics of Mississippi M & D clay and 35–80% by weight mineral wool and back-coated with, on a dry weight basis, greater than about 15 grams of kaolin clay per square foot, said kaolin clay having an average particle size of from about 1.0 to 2.0 microns, said clay when mixed with 50% by weight of Ottawa sand and fired as a sand-clay brick having a modulus of rupture of less than about 50 lbs. per square inch, the coated board having been fired at a temperature in the range of from about 1,000° to 1,600° F.

4. A ceramic acoustical board in accordance with claim 3 in which said kaolin clay is Klondyke clay of a particle size distribution such that less than about 40% by weight of the particles are less than 1.0 micron in size and more than 80% by weight of the particles are less than 5.0 microns in size.

References Cited
UNITED STATES PATENTS 3,333,656  8/1967  Shannon _____ 117—126 XR ALFRED L. LEAVITT, Primary Examiner W. F. CYRON, Assistant Examiner U.S. Cl. X.R.

117—126